(12) United States Patent
Khamesra et al.

(10) Patent No.: US 11,625,355 B2
(45) Date of Patent: Apr. 11, 2023

(54) SWITCHING CLOCK PHASE SHIFT FOR MULTI-PORT BUCK-BOOST CONVERTER

(71) Applicant: Cypress Semiconductor Corporation, San Jose, CA (US)

(72) Inventors: Arun Khamesra, Bangalore (IN); Pulkit Shah, Bangalore (IN); Praveen Suresh, Bangalore (IN); Hariom Rai, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/410,888

(22) Filed: Aug. 24, 2021

(65) Prior Publication Data

US 2022/0066980 A1     Mar. 3, 2022

Related U.S. Application Data

(60) Provisional application No. 63/073,884, filed on Sep. 2, 2020.

(51) Int. Cl.
| | |
|---|---|
| *G06F 13/42* | (2006.01) |
| *G06F 1/08* | (2006.01) |
| *H02M 3/156* | (2006.01) |
| *G06F 1/26* | (2006.01) |
| *H02M 3/155* | (2006.01) |
| *H02M 3/158* | (2006.01) |

(52) U.S. Cl.
CPC ............ *G06F 13/4291* (2013.01); *G06F 1/08* (2013.01); *G06F 1/266* (2013.01); *H02M 3/1552* (2021.05); *H02M 3/1563* (2013.01); *H02M 3/1566* (2021.05); *H02M 3/1582* (2013.01); *G06F 2213/0042* (2013.01); *G06F 2213/3852* (2013.01)

(58) Field of Classification Search
CPC ........ G06F 13/4291; G06F 1/08; G06F 1/266; G06F 2213/0042; G06F 2213/3852; H02M 3/1552; H02M 3/1563; H02M 3/1566; H02M 3/1582; Y02D 10/00
See application file for complete search history.

(56) References Cited

U.S. PATENT DOCUMENTS

| | | | |
|---|---|---|---|
| 6,597,157 B1 * | 7/2003 | Boeckmann | G05F 1/618 323/242 |
| 10,756,644 B1 * | 8/2020 | Shah | H02M 3/07 |

(Continued)

*Primary Examiner* — Glenn A. Auve (57) ABSTRACT

A multi-port USB Type-C® Power Delivery (USB-C/PD) power converter for switching clock phase shifts is described herein. The multi-port USB-C/PD power converter includes a first PD port, a second PD port, and a power controller coupled to the first and second PD ports. The power controller includes a first phased clock generator to generate a first phase-shifted clock signal by shifting a clock signal by a first phase with respect to a reference clock signal, and a second phased clock generator to generate a second phase-shifted clock signal to generate a second phased-shifted clock signal by shifting the clock signal by a second phase with respect to the reference clock signal. The first PD port and the second PD port output power in response to a first control signal based on the first phase-shifted clock signal and a second control signal based on the second phase-shifted clock signal, respectively.

20 Claims, 6 Drawing Sheets

(56) References Cited

U.S. PATENT DOCUMENTS

| | | | |
|---|---|---|---|
| 2014/0266011 A1* | 9/2014 | Mehta | H02M 3/1584 320/107 |
| 2015/0162828 A1* | 6/2015 | Sandner | H02M 3/1584 323/271 |
| 2017/0222464 A1* | 8/2017 | Pullen | H02J 7/0068 |
| 2018/0090945 A1* | 3/2018 | Langlinais | H02J 7/0045 |
| 2019/0288532 A1* | 9/2019 | Mattos | H02J 7/0034 |
| 2020/0091758 A1* | 3/2020 | Jahan | H02J 7/0019 |
| 2020/0174546 A1* | 6/2020 | Bodnaruk | G06F 13/4282 |
| 2021/0083500 A1* | 3/2021 | Quek | H02J 7/0024 |
| 2021/0167623 A1* | 6/2021 | Sanghvi | H02J 7/0013 |

* cited by examiner

SWITCHING CLOCK PHASE SHIFT FOR MULTI-PORT BUCK-BOOST CONVERTER

PRIORITY

This application claims the benefit of U.S. Provisional Application No. 63/073,884, filed on Sep. 2, 2020, the entire contents of which are incorporated by reference herein in their entirety.

TECHNICAL FIELD

This disclosure relates to integrated circuits (ICs) that control Universal Serial Bus (USB) power delivery to electronic devices.

BACKGROUND

Various electronic devices (e.g., such as smartphones, tablets, notebook computers, laptop computers, chargers, adapters, power banks, etc.) are configured to transfer power through USB connectors according to USB power delivery protocols defined in various versions and revisions of the USB Power Delivery (USB-PD) specification. For example, in some applications an electronic device may be configured as a power consumer to receive power through a USB connector (e.g., for battery charging), while in other applications an electronic device may be configured as a power provider to provide power to another device that is connected thereto through a USB connector. In various applications, electronic manufacturers may also use power converters (e.g., such as buck-boost converters) that need to meet various USB-PD specification requirements such as, for example, requirements for electromagnetic interference (EMI).

DETAILED DESCRIPTION

The following description sets forth numerous specific details such as examples of specific systems, components, methods, and so forth, in order to provide a good understanding of various embodiments of switching clock phase shifts for multi-port power converters, such as buck-boost converters, described herein. It will be apparent to one skilled in the art, however, that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present embodiments.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of a reference and phased clock controllers in USB Type-C® controllers that can be disposed to operate in various electronic devices. "USB Type-C®" and "USB-C®" are registered trademarks of USB Implementers Forum for products based on and compliant with the USB Type-C® cable and connector specification. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., cables, hubs, docking stations, adapters, chargers, etc.), audio/video/data recording and/or playback devices (e.g., cameras, voice recorders, hand-held scanners, monitors, etc.), and other similar electronic devices that can use USB interfaces for communication, battery charging, and/or power delivery.

As used herein, "USB-enabled" device or system refers to a device or system that includes, is configured with, or is otherwise associated with a USB connector interface. A USB-enabled electronic device may comply with at least one release of a Universal Serial Bus (USB) specification. Examples of such USB specifications include, without limitation, the USB Specification Revision 2.0, the USB 3.0 Specification, the USB 3.1 Specification, the USB 3.2 Specification and/or various supplements, versions and errata thereof. The USB specifications generally define the characteristics (e.g., attributes, protocol definition, types of transactions, bus management, programming interfaces, etc.) of a differential serial bus that are required to design and build standard communication systems and peripherals. For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C® (also referred to herein as "USB-C®"), is defined in various releases and/or versions of the USB Type-C® specification. The USB Type-C® specification defines Type-C receptacles, Type-C plugs, and Type-C cables that can support USB communications as well as power delivery over newer USB power delivery protocols defined in various revisions/versions of the USB-PD specification. Examples of USB Type-C® functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C® specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (or communication channel, denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C® connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification. The USB-PD specification defines a standard protocol designed to enable the maximum functionality of USB-enabled devices by providing more flexible power delivery along with data communications over a single USB Type-C® cable through USB Type-C® ports. The USB-PD specification also describes the architecture, protocols, power supply behavior, parameters, and cabling necessary for managing power delivery over USB Type-C® cables at up to 100 W of power. According to the USB-PD specification, devices with USB Type-C® ports (e.g., such as USB-enabled devices) may negotiate for more current and/or higher or lower voltages over a USB Type-C® cable than are allowed in older USB specifications (e.g., such as the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc. As used herein, "USB-PD subsystem" refers to one or more logic blocks and other analog/digital hardware circuitry, which may be controllable by firmware in an IC controller and which is configured and operable to perform the functions and to satisfy the requirements specified in at least one release of the USB-PD specification. The IC controller can be implemented in a USB Type-C® device. The IC controller can be implemented in a USB device.

Power delivery in accordance with the USB-PD specification(s) can be embodied in several different types of USB Type-C® applications. Examples of such types of Type-C applications include, but may not be limited to: a downstream facing port (DFP) application, in which an IC controller with a USB-PD subsystem is configured to provide a downstream-facing USB port (e.g., in a USB-enabled host device); an upstream facing port (UFP) application, in which an IC controller with a USB-PD subsystem is configured to provide an upstream-facing USB port (e.g., in a USB-enabled peripheral device or adapter); a dual role port (DRP) USB application, in which an IC controller with a USB-PD subsystem is configured to support both DFP and UFP applications on the same USB port (e.g., a USB Type-C® port that is configured to operate as either a power provider or a power consumer or can alternate between these two roles dynamically by using USB-PD power role swap); and an active cable application, in which an IC controller with a USB-PD subsystem is disposed into, and configured to operate, an electronically marked cable assembly (EMCA) Type-C cable.

Some dual-port power converters (or, in general, multi-port power converters) can deliver power (e.g., up to 100 watts (W)) from each port. For example, in the case of a dual-port buck-boost converter, an inductor current for each port may be charged and discharged in a switching cycle to deliver output power through each respective port. One or more power controllers (e.g., power-delivery controllers) may be used to drive high-side switches and low-side switches (e.g., field-effect transistors (FETs), approximately gate capacitance up to 3 nano-Farads) in a switching cycle to provide the output power. The power controller may drive the switches rapidly (e.g., with rise/fall times of approximately ten to twenty nanoseconds) to minimize switching losses. This can cause high peak currents on the supply and ground terminals since various high-side and low-side switches may be toggled. If both buck-boost converters of the dual-port power converter are switched with the same switching frequency and with higher output load, then there can be twice the peak current in a single switching cycle, which can cause a higher dynamic voltage drop and can cause EMI issues.

Aspects of the present disclosure solve the above deficiencies among others by providing an architecture and a method to control a dual-port (or multi-port) power converter at the same switching frequency but with a phase shift using a single power controller. Including a phase shift between the switching of each port reduces peak currents in each switching cycle and further minimizes EMI issues. Because the dual-port power converter is controlled with a single integrated circuit power controller, the footprint of the power converter can be reduced since there is no extra external clock pin required to introduce a phase shift (compared to having two power controllers).

Details of a multi-port power converter are described below. Also described herein are various embodiments directed to an IC controller that includes one or more clocks to generate a master clock and various phase-shifted slave clocks. In one example embodiment, a multi-port power converter includes a first power-delivery (PD) port, a second PD port, and a power controller coupled to the first PD port and the second PD port. The power controller includes a reference clock generator to generate a reference clock signal with a first frequency, a high-frequency clock generator to generate a clock signal with a second frequency that is greater than the first frequency, a first phased clock generator to generate a first phase-shifted clock signal by shifting the clock signal by a first phase with respect to the reference clock signal, and a second phased clock generator to generate a second phase-shifted clock signal by shifting the clock signal by a second phase with respect to the reference clock signal. The first PD port outputs power in response to a first control signal which is based on the first phase-shifted clock signal. The second PD port is to output power in response to a second control signal which is based on the second phase-shifted clock signal.

Figure 1:
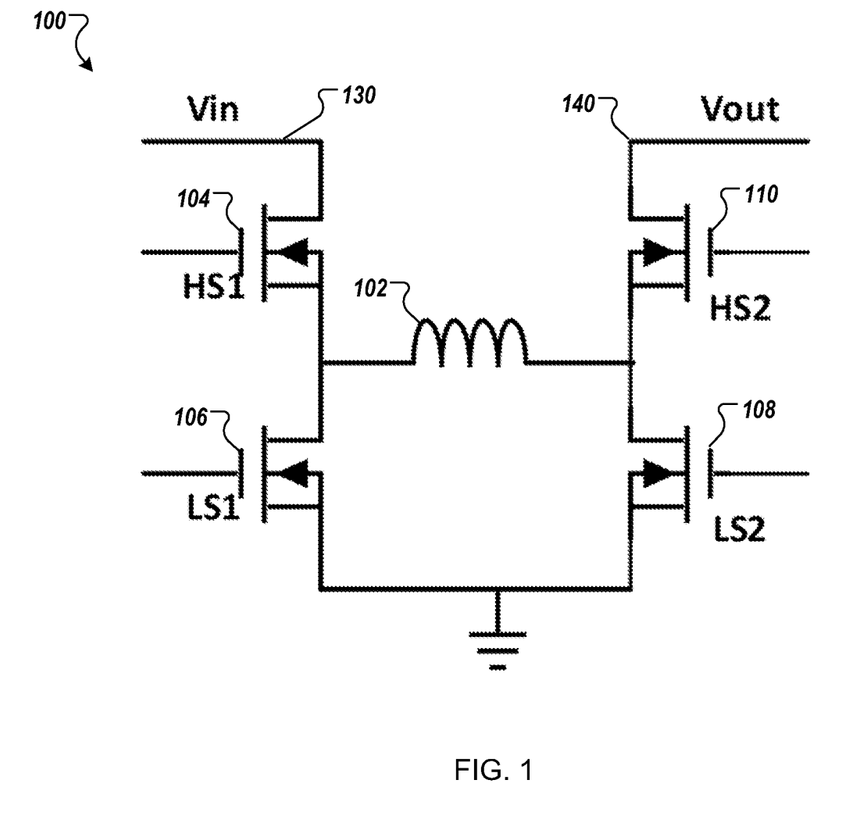
FIG. 1 is a schematic diagram of a buck-boost converter according to one embodiment.

FIG. 1 is a schematic diagram of a buck-boost converter 100 according to one embodiment. Buck-boost converter 100 includes an inductor 102, a first switch 104, a second switch 106, a third switch 108, and a fourth switch 110. Switches 104 and 110 are also referred to as high-side (HS) switches, and switches 106 and 108 are referred to as low-side (LS) switches. First switch 104 is coupled to an input voltage (Vin) 130 and fourth switch 110 is coupled to an output voltage (Vout) 140. The switches can be controlled to operate the buck-boost converter 100 in one of four modes, including a buck mode, a buck-boost (BB) buck mode, a BB boost mode, and a boost mode.

Figure 2:
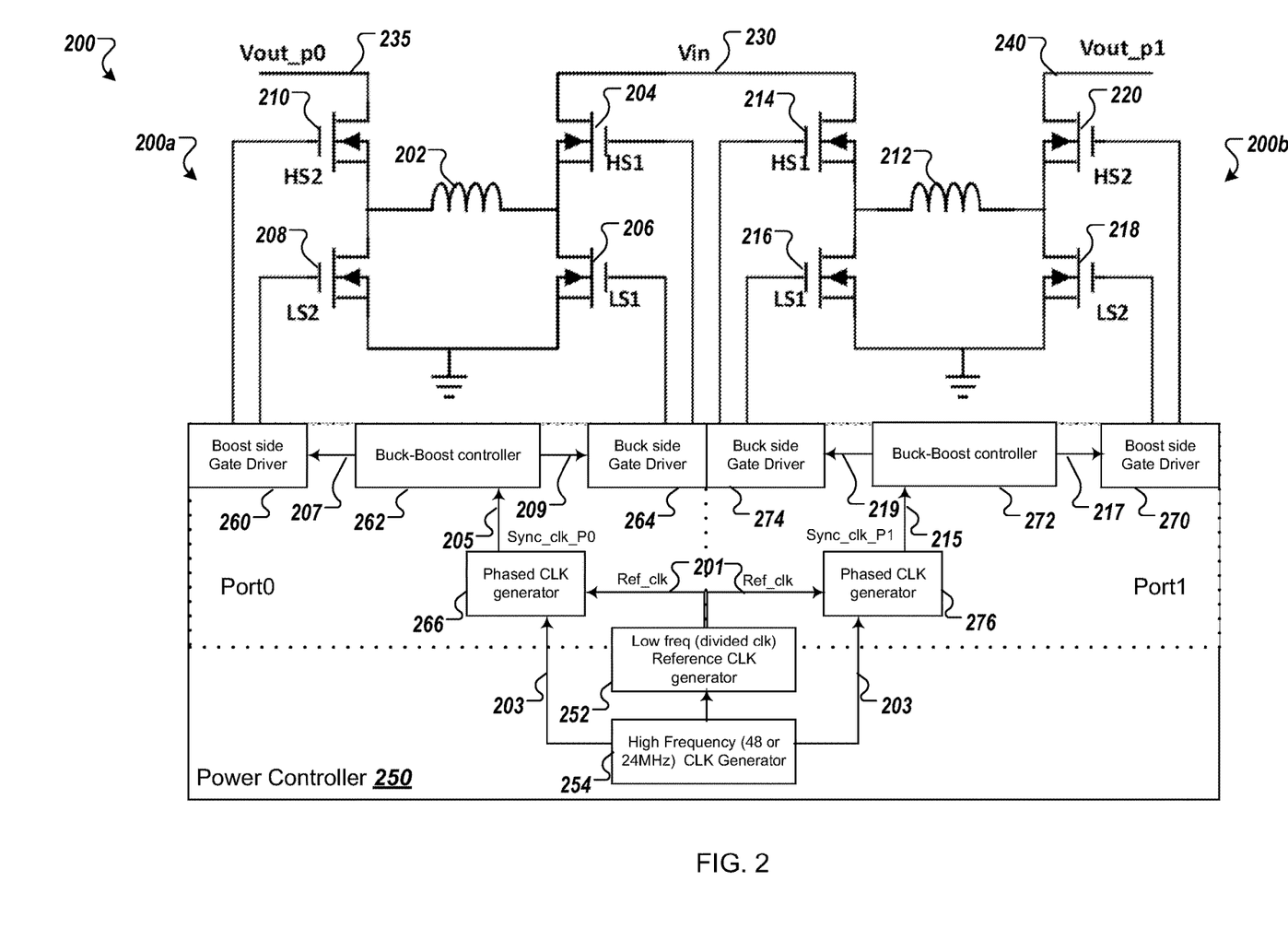
FIG. 2 is a schematic diagram of a dual-port power converter with a power controller to generate two phased-shifted clock signals for switching a first port (p0) and a second port (p1) of the dual-port power converter according to one embodiment.

FIG. 2 is a schematic diagram of a dual-port power converter 200 with a power controller 250 to generate two phased-shifted clock signals for switching a first port (p0) and a second port (p1) of dual-port power converter 200 according to one embodiment. In some embodiments, dual-port power converter 200 may be a USB Type-C® Power Delivery (USB-C/PD) power converter. Power converter 200 may include a first buck-boost converter 200a and a second buck-boost converter 200b which correspond to a first output port (p0) and a second output port (p1), respectively. The first output port and the second output port may output power based on clocking signals as described below. First output port may output a first output voltage (Vout_p0) 235 and second output port may output a second output voltage (Vout_p1) 240. The first output port, p0, (also referred to as a first power-delivery (PD) port) and the second output port, p1, (also referred to as a second PD port) may share an input voltage source (Vin) 230. Power converter 200 may also include power controller 250 (also referred to as a PD controller) coupled to first buck-boost converter 200a and second buck-boost converter 200b. In some embodiments, power controller 250 may be an integrated circuit (IC) USB-PD/C power controller.

First buck-boost converter 200a includes an inductor 202, a first switch (HS1) 204, a second switch (LS1) 206, a third switch (LS2) 208, and a fourth switch (HS2) 210. First switch 204 is coupled to input voltage 230 and fourth switch 210 is coupled to first output voltage 235.

Second buck-boost converter 200b includes an inductor 212, a first switch (HS1) 214, a second switch (LS1) 216, a third switch (LS2) 218, and a fourth switch (HS2) 220. First switch 214 is coupled to input voltage 230 and fourth switch 220 is coupled to second output voltage 240.

Power controller 250 provides various controls (e.g., by sending one or more control signals, clock signals, voltages, and the like) to first buck-boost converter 200a and second buck-boost converter 200b. Power controller includes a low-frequency clock generator 252 (e.g., a reference clock generator) and a high-frequency clock generator 254. Power controller includes a first boost-side gate driver 260, a first buck-boost controller 262, a first buck-side gate driver 264, and a first phased clock generator 266 corresponding to the first port, p0. Power controller 250 also includes a second boost-side gate driver 270, a second buck-boost controller 272, a second buck-side gate driver 274, and a second phased clock generator 276 corresponding to the second port, p1. Power controller 250 may include one or more terminals to couple to the first port, and one or more additional terminals to couple to the second port.

Low-frequency clock generator 252 may generate a low-frequency (e.g., 50 Kilo-hertz (KHz) or 100 KHz) reference clock signal to be used as a reference clock signal (Ref_clk) 201. High-frequency clock generator 254 may generate a high-frequency (e.g., 24 Mega-hertz (MHz), 48 MHz, etc.) clock signal 203. Low-frequency clock generator 252 may be generated from High-frequency clock 203 by using divide-by-clk method. Each phased clock generator 266 and 276 receive reference clock signal 201 from low-frequency clock generator 252 and high-frequency clock signal 203 from high-frequency clock generator 254. Phased clock generator 266 may generate a first phase-shifted clock signal (Sync_clk_P0) 205 as per switching frequency (e.g., 200 KHz, 400 KHz, etc) of first port (p0), by introducing a first phase shift (e.g., a time delay) using high-frequency clock signal 203. Phased clock generator 276 may generate a second phase-shifted clock signal (Sync_clk_P1) 215 as per switching frequency (e.g., 200 KHz, 400 KHz, etc) of second port (p1), by introducing a second phase shift (e.g., a time delay) using high frequency clock signal 203. In some embodiments, the second phase shift may be different than the first phase shift, such that the switching of the LS and HS switches for the first port (p0) and the second port (p1) are out of phase with respect to each other, even when switching frequency of the first port (p0) and the second port (p1) are of same frequency.

With regards to first buck-boost converter 200a, first buck-boost controller 262 receives first phase-shifted clock signal 205 from first phased clock generator 266. First buck-boost controller 262 may generate first control signal(s) 207, to control first boost-side gate driver 260 and may generate second control signal(s) 209, to control first buck-side gate driver 264. First boost-side gate driver 260 receives first control signal(s) 207 and first buck-side gate driver 264 receives second control signal(s) 209. First control signal(s) 207 and second control signal(s) 209 may be based on first phase-shifted clock signal 205. In some embodiments, first control signal(s) 207 and second control signal(s) 209 may be the same or similar. First boost-side gate driver 260 may generate additional control signals to control third switch (LS2) 208 and fourth switch (HS2) 210. First buck-side gate driver 264 may generate additional control signals to control first switch (HS1) 204 and second switch (LS1) 206.

With regards to second buck-boost converter 200b, second buck-boost controller 272 receives second phase-shifted clock signal 215 from second phased clock generator 276. Second buck-boost controller 272 may generate first control signal 217(s), to control second boost-side gate driver 270 and may generate second control signal(s) 219 to control second buck-side gate driver 274. Second boost-side gate driver 270 receives first control signal(s) 217 and second buck-side gate driver 274 receives second control signal(s) 219. First control signal(s) 217 and second control signal(s) 219 may be based on second phase-shifted clock signal 215. In some embodiments, first control signal(s) 217 and second control signal(s) 219 may be the same or similar. Second boost-side gate driver 270 may generate additional control signals to control third switch (LS2) 218 and fourth switch (HS2) 220. Second buck-side gate driver 274 may generate additional control signals to control first switch (HS1) 214 and second switch (LS1) 216.

In some embodiments, the power converter may be a multi-port alternating current-to-direct current (AC-DC) power converter rather than a multi-port buck-boost power converter. In this case, a single power controller may generate phase-shifted clock signals that are used to control switching of each port of the AC-DC power converter. Control signals may be generated to control two switches per port (rather than four switches, as the case for the buck-boost power converter) to output power by the corresponding port.

Figure 3:
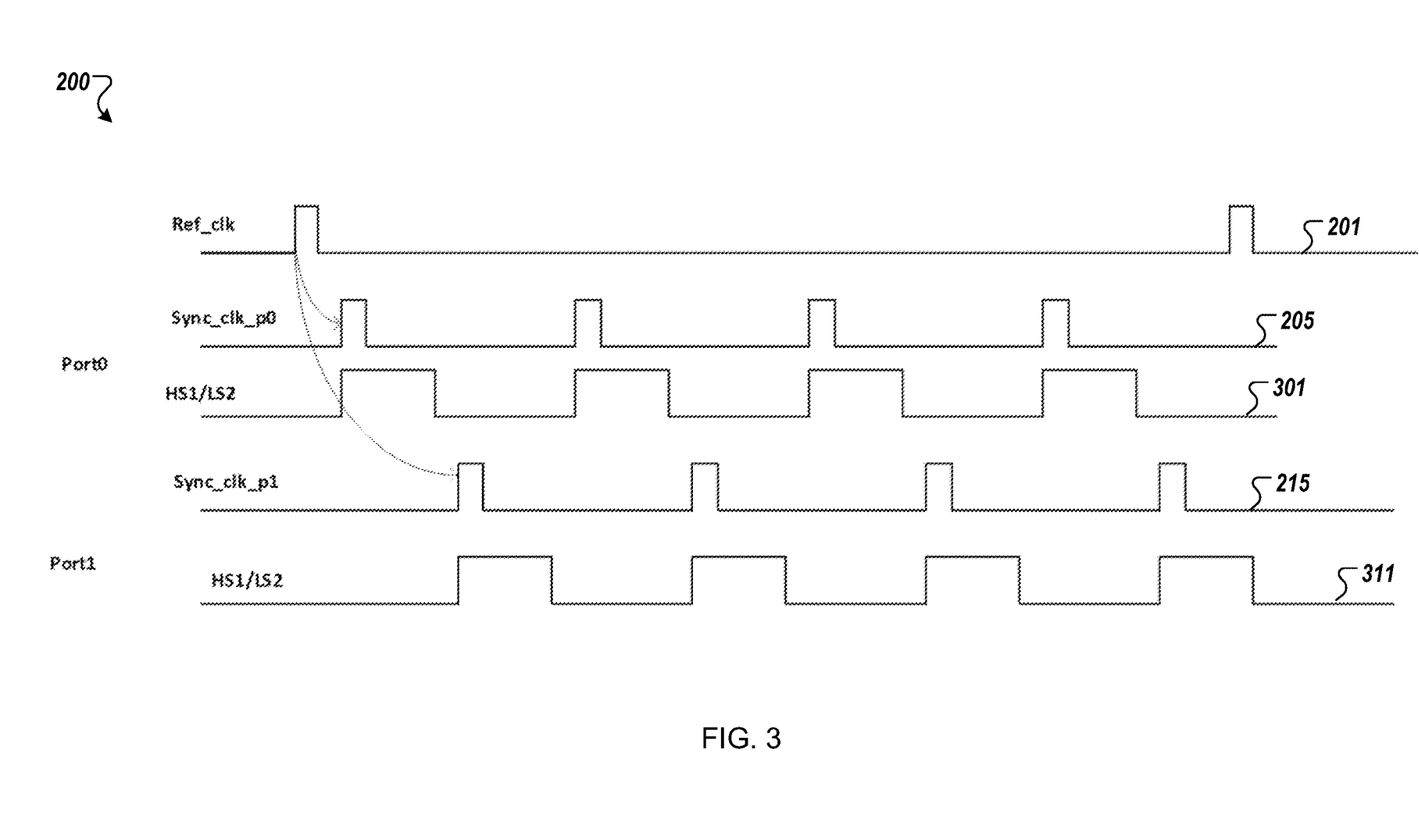
FIG. 3 is a timing diagram of a reference clock signal, a first phase-shifted clock signal, a second phase-shifted clock signal, a first control signal, and a second control signal according to one embodiment.

FIG. 3 is an example timing diagram of reference clock signal 201, first phase-shifted clock signal 205, second phase-shifted clock signal 215, a first control signal 301, and a second control signal 311 according to one embodiment. First control signal 301 may be based on first control signal 207 and second control signal 209 of first buck-boost converter 200a. First control signal 301 may control switching of at least first switch (HS1) 204 and third switch (LS2) 208 to provide first output voltage (Vout_p0) 235 for first buck-boost converter 200a. Second control signal 311 may be based on first control signal 217 and second control signal 219 of second buck-boost converter 200b. Second control signal 311 may control switching of at least first switch (HS1) 214 and third switch (LS2) 218 to provide second output voltage (Vout_p1) 240 for second buck-boost converter 200b.

Reference clock signal (Ref_clk) 201 may be a programmable clock signal which can be modified (e.g., via registers of power controller 250) based on system and/or consumer requirements. First phase-shifted clock signal 205, to be used for first port (p0), and second phase-shifted clock signal 215, to be used for second port (p1), may be programmed (e.g., via registers of power controller 250) for switching frequency as required by system and/or consumer requirement for respective ports. First phase-shifted clock signal 205 and second phase-shifted clock signal 215 can be phase shifted by a phase (e.g., via registers of power controller 250) with regard to a rising edge of reference clock signal 201. In some embodiments, either first phase-shifted clock signal 205 or second phase-shifted clock signal 215 can be phase shifted by a phase between 0 degrees and 180 degrees. In other embodiments, either first phase-shifted clock signal 205 or second phase-shifted clock signal 215 can be shifted by a phase between 0 degrees and 360 degrees. In some embodiments, first phase-shifted clock signal 205 may be shifted by a first phase between 0 degrees and 180 degrees, while second phase-shifted clock signal 215 may be shifted by a second phase between 0 degrees and 180 degrees.

In some embodiments, when power controller 250 of power converter 200 is enabled, low-frequency clock generator 252 may generate reference clock signal 201, and high-frequency clock generator 254 may generate high-frequency clock signal 203 that are initially aligned (e.g., their rising edges are aligned in time). High-frequency clock signal 203 may be received by both phased clock generators 266 and 276. Phased-clock generators 266 and 276 may each apply different phase shifts (e.g., a first phase shift and a second phase shift, respectively) to generate first phase-shifted clock signal 205 and second phase-shifted clock signal 215. In some embodiments, the rising edge of first phase-shifted clock signal 205 and the rising edge of second phase-shifted clock signal 215 may occur at different points in time. This causes first control signal 301 and second control signal 311 to be phase shifted with respect to each other. Subsequently, switches 204 and 208 (and eventually switches 206 and 210 as the gate signal for switch 206 is generated in accordance to gate signal of switch 204 and similarly gate signal for switch 210 is generated in accordance to gate signal of switch 208) may be switched by waveforms that are phase shifted compared to switches 214 and 218 (and eventually switches 216 and 220 as the gate signal for switch 216 is generated in accordance to gate signal of switch 214 and similarly gate signal for switch 220 is generated in accordance to gate signal of switch 218). In some embodiments, the phase shift between first control signal 301 and second control signal 311 is such that they are out of phase with respect to the other and switches 204 and 208 and switched (on/off) out of phase with switches 214 and 218. In other words, the first port provides first output voltage 235 and the second port provides second output voltage 240 such that the power provided by the first port has phase-shifted profile as comparted to the power provided by the second port. In some embodiments, when first control signal 301 and second control signal 311 are 180 degrees out-of-phase (e.g., they are non-overlapping), the first duration of time and the second duration of time are not overlapping (e.g., do not overlap) and results in non-overlapping power profiles between the two ports. In other words, power provided by the first port and power provided by the second port has profiles that do not overlap or coincide. In some embodiments, the first control signal 301 and the second control signal 311 are sufficiently out-of-phase such that the power provided by first port and the power provided by second port has profiles that do not overlap or coincide. In other embodiments, first control signal 301 and second control signal 311 are partially out of phase and the first duration of time and the second duration of time may at least partially overlap, such that the power provided by first port and the power provided by second port has profiles that partially overlap.

The phase shift applied by phased clock generators 266 and 276 may be digitally controlled by firmware of power controller 250 based on application and/or consumer requirements. Controlling the phase shift between first control signal 301 and second control signal 311 (and therefore switching of i) switches 204 and 208 and ii) switches 214 and 218) can reduce peak currents in power and ground of the chip, as well as reducing EMI of power converter 200. Because power converter 200 includes only a single power controller 250, and both phase-shifted clock signals 205 and 215 are generated based on low-frequency clock generator 252 and high-frequency clock generator 254 and phase shifted with phased clock generators 266 and 276, there are no extra components or clock sources required in power controller 250 required to support a phase shift between the first port and the second port.

Although in FIG. 2, power converter 200 is depicted as having two ports providing two output voltages (Vout_p0 and Vout_p1), the methods described above can be applicable to multi-port power converters (e.g., with three, four, five, or more ports). In this case, each port may be switched (e.g., using corresponding phased clock generators) with an arbitrary or predefined phase shift. In some embodiments, each port may be switched with different phases such that the power provided by each port has profile which is non-overlapping or partially overlapping or fully overlapping depending on the phase-shift programmed. In other embodiments, each port may be switched such that only one port is providing power at any given time. In other embodiments, each port may be switched such that a first subset of the ports may provide power for a first duration of time, a second subset of the ports may provide power for a second duration of time, a third subset of the ports may provide power for a third duration of time, and so forth, where each duration of time may or may not overlap another duration of time. For example, in some embodiments, the first subset of ports may provide power for the first duration of time; when the first subset of ports stops providing power, the second subset of ports may provide power for the second duration of time; when the second subset of ports stops providing power, the third subset of ports may provide power for the third duration of time; and so forth. In some embodiments, there may be gaps in time between when each subset of ports is providing power (e.g., there may be times during which no ports are providing power).

Figure 4:
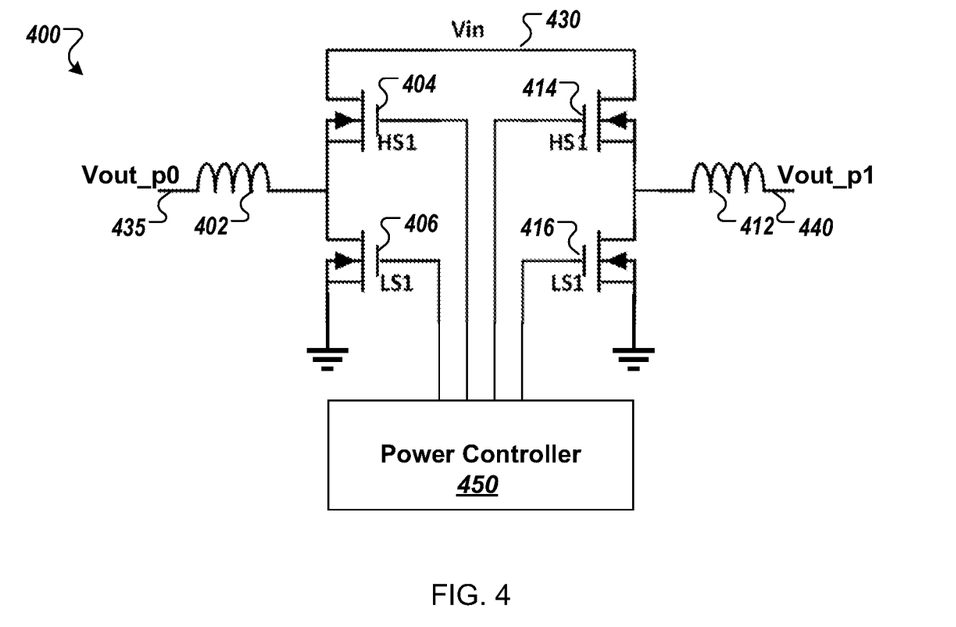
FIG. 4 is a schematic diagram of a dual-port buck-only mode power converter according to one embodiment.

FIG. 4 is a schematic diagram of a dual-port buck-only mode power converter 400 according to one embodiment. Power converter 400 may be similar to power converter 200 of FIG. 2, except that power converter 400 operates in a buck-only mode. For example, in some embodiments, power converter 400 may be a USB-PD Type-C (USB-PD/C) power converter. Power converter 400 includes a power controller 450, which may be similar to power controller 250 of FIG. 2 except that it may not include boost-side gate drivers 260 and 270.

Power converter 400 may include a first output port (p0) to output a first output voltage (Vout_p0) 435 and a second output port (p1) to output a second output voltage (Vout_p1) 440. The first output port and the second output port may share an input voltage (Vin) 430. Power converter 400 may also include a power controller 450. Power converter may include a first inductor 402 and a second inductor 412 coupled to the first output port and the second output port, respectively. Power converter 400 may include a first switch (HS1) 404, a second switch (LS1) 406, a third switch (HS1) 414, and a fourth switch (LS1) 416. First switch 404 and third switch 414 are coupled to input voltage 430.

Power controller 450 provides various controls (e.g., by sending one or more control signals, clock signals, voltages, and the like) to control power output through the first port and the second port. Power controller 450 may include a low-frequency clock generator and a high-frequency clock generator. Power controller 450 may include a first buck-boost controller or buck-controller, a first buck-side gate driver, and a first phased clock generator corresponding to the first port, p0. Power controller 450 may also include a second buck-boost controller or buck-controller, a second buck-side gate driver, and a second phased clock generator corresponding to the second port, p1.

As described above with respect to FIG. 2, the low-frequency clock generator may generate a low-frequency (e.g., 50 kilo-hertz (KHz), 100 KHz, etc) clock signal to be used as a reference clock signal (Ref_clk). The high-frequency clock generator may generate a high-frequency (e.g., 24 Mega-Hertz (MHz), 48 MHz, etc.) clock signal. Each of the first and second phased clock generators may receive the reference clock signal from the low-frequency clock generator and the high-frequency clock signal from the high-frequency clock generator. Each phased clock generator can introduce a separate phase delay to the corresponding high-frequency clock signal, such that the switching of the LS and HS switches for the first port (p0) and the second port (p1) are out of phase with respect to each other.

Figure 5:
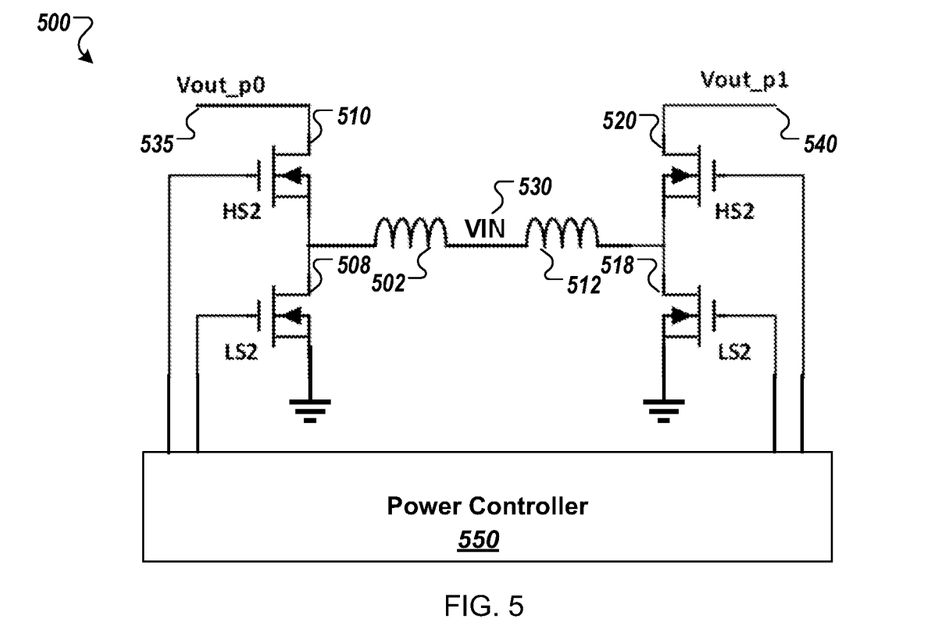
FIG. 5 is a schematic diagram of a dual-port boost-only mode power converter according to one embodiment.

FIG. 5 is a schematic diagram of a dual-port boost-only mode power converter 500 according to one embodiment. Power converter 500 may be similar to power converter 200 of FIG. 2, except that power converter 500 operates in a boost-only mode. For example, in some embodiments, power converter 500 may be a USB-PD Type-C (USB-PD/C) power converter. Power converter 500 includes a power controller 550, which may be similar to power controller 250 of FIG. 2 except that it may not include buck-side gate drivers 264 and 274.

Power converter 500 may include a first output port (p0) to output a first output voltage (Vout_p0) 535 and a second output port (p1) to output a second output voltage (Vout_p1) 540. The first output port and the second output port may share an input voltage (Vin) 530. Power converter 500 may also include a power controller 550. Power converter 500 may include a first inductor 502 and a second inductor 512 coupled to the first output port and the second output port, respectively. Power converter 500 may include a first switch (LS2) 508, a second switch (HS2) 510, a third switch (LS2) 518, and a fourth switch (HS2) 520.

Power controller 550 provides various controls (e.g., by sending one or more control signals, clock signals, voltages, and the like) to control power output through the first port and the second port. Power controller 550 may include a low-frequency clock generator and a high-frequency clock generator. Power controller 550 may include a first buck-boost controller or boost controller, a first boost-side gate driver, and a first phased clock generator corresponding to the first port, p0. Power controller 550 may also include a second buck-boost controller or boost controller, a second boost-side gate driver, and a second phased clock generator corresponding to the second port, p1.

As described above with respect to FIG. 2, the low-frequency clock generator may generate a low-frequency (e.g., 50 kilo-hertz (KHz), 100 KHz, etc.) clock signal to be used as a reference clock signal (Ref_clk). The high-frequency clock generator may generate a high-frequency (e.g., 24 mega-hertz (MHz), 48 MHz, etc.) clock signal. Each of the first and second phased clock generators may receive the reference clock signal from the low-frequency clock generator and the high-frequency clock signal from the high-frequency clock generator. Each phased clock generator can introduce a separate phase delay to the corresponding high-frequency clock signal, such that the switching of the LS and HS switches for the first port (p0) and the second port (p1) are out of phase with respect to each other.

Although power converter 200 of FIG. 2, power converter 400 of FIG. 4, and power converter 500 of FIG. 5 are illustrated as have two ports (e.g., as being dual-port power converters), the methods of phase-shifted clock signals to control output power at various ports may be applied to multi-port power converters (e.g., power converters with three, four, five, or more ports).

Figure 6:
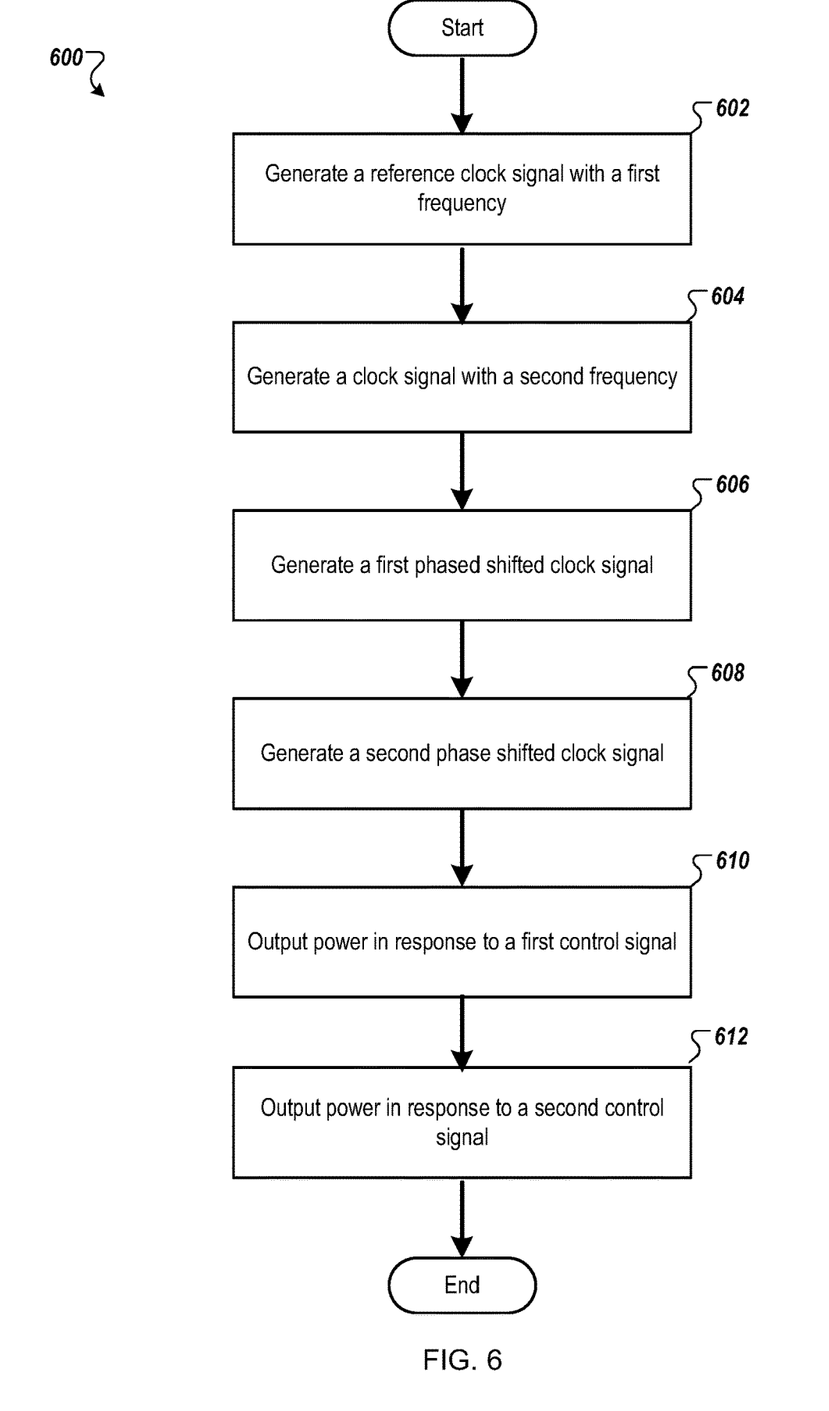
FIG. 6 is a flow diagram of a method of providing phase-shifted switching control of a multi-port power converter according to one embodiment.

FIG. 6 is a flow diagram of a method 600 of providing phase-shifted switching control of a multi-port power converter according to one embodiment. Method 600 can be performed by processing logic including hardware, firmware, or any combination thereof. Method 600 can be performed by power converter 200 of FIG. 2. In some embodiments, method 600 can be performed by power controller 250 of FIG. 2. In some embodiments, method 600 can be performed by power converter 400 of FIG. 4. In some embodiments, method 600 can be performed by power controller 450 of FIG. 4. In some embodiments, method 600 can be performed by power converter 500 of FIG. 5. In some embodiments, method 600 can be performed by power controller 550 of FIG. 5.

Referring back to FIG. 6, method 600 begins by processing logic generating a reference clock signal with a first frequency (block 602). Processing logic generates a clock signal with a second frequency (block 604). The second frequency is greater than the first frequency. Processing logic generates a first phase-shifted clock signal by shifting the clock signal by a first phase with respect to the reference clock signal (block 606). Processing logic generates a second phase-shifted clock signal by shifting the clock signal by a second phase with respect to the reference clock signal (block 608). Processing logic outputs power in response to a first control signal (block 610). The first control is being based on the first phase-shifted clock signal. Processing logic outputs power in response to a second control signal (block 612). The second control signal is based on the second phase-shifted clock signal; and the method 600 ends.

The processing logic generates the first control signal and the second control signal via a first buck-boost controller and a second buck-boost controller, respectively. In further embodiments, the processing logic receives the first control signal and controls a first high-side HS and a first LS switch based on the first control signal. The processing logic receives the first control signal and controls a second HS switch and a second LS switch based on the first control signal. The processing logic receives the second control signal and controls a third HS switch and a third LS switch based on the second control signal. The processing logic receives the second control signal and controls a fourth HS switch and a fourth LS switch based on the second control signal.

In some embodiments, the first HS switch and the first LS switch are coupled to an input voltage source. The second HS switch and the second LS switch are coupled to the first PD port. The third HS switch and the third LS switch are coupled to the input voltage source. The fourth HS switch and the fourth LS switch are coupled to the second PD port.

In further embodiments, the processing logic generates a third phase-shifted clock signal by shifting the clock signal by a third phase with respect to the reference clock signal. The processing logic outputs power in response to a third control signal. The third control signal is based on the third phase-shifted clock signal.

In some embodiments, the first phase is between 0 degrees and 180 degrees and the second phase is between 0 degrees and 180 degrees. In some embodiments, the second frequency is greater than the first frequency.

In some embodiments, the power converter is a direct current-to-direct current (DC-DC) converter, such as a buck-boost converter, a boost converter, or a buck converter. In other embodiments, the power converter is an AC-DC power converter, or the like.

Figure 7:
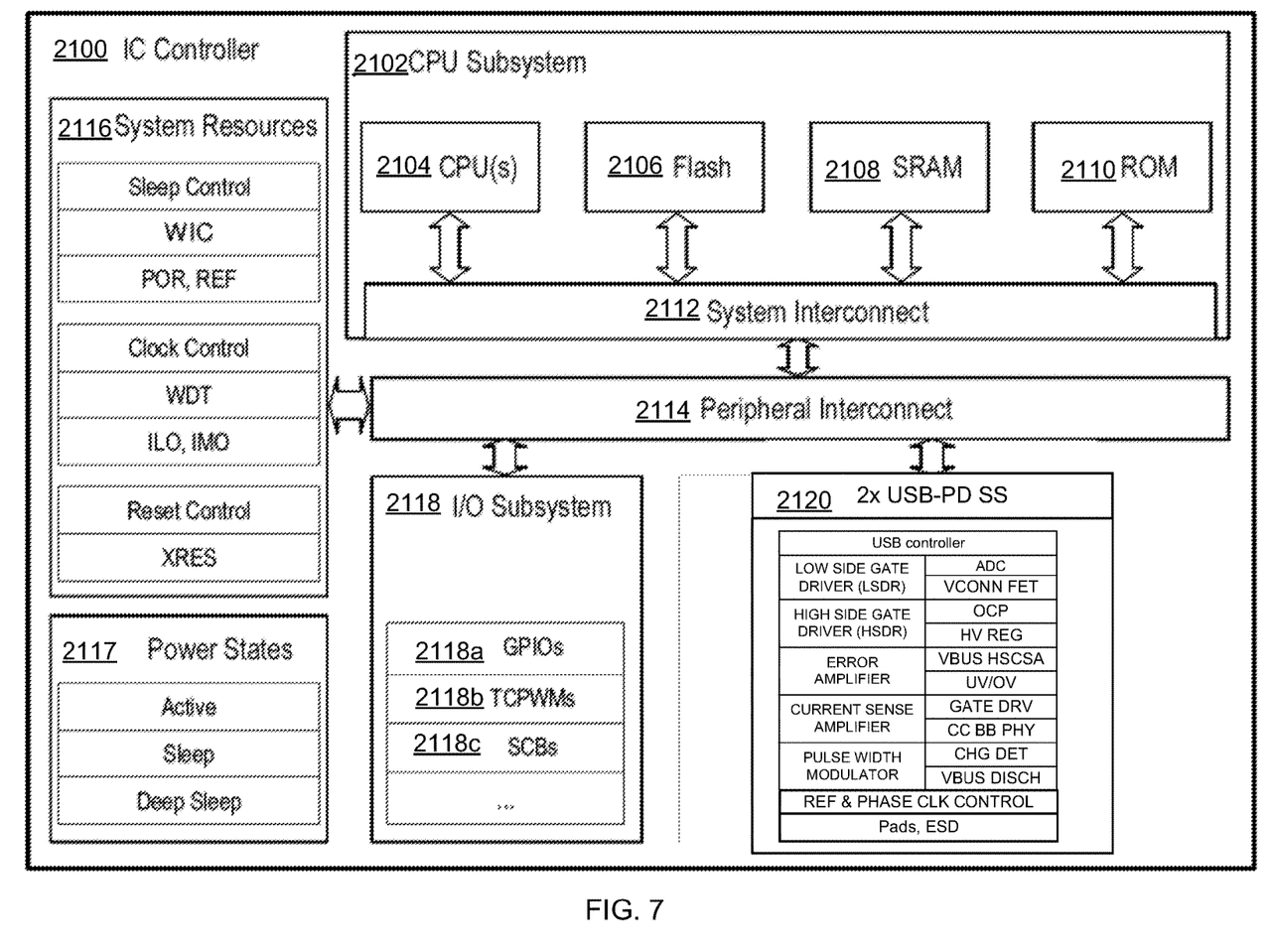
FIG. 7 is a block diagram of an on-die IC controller with a USB-PD subsystem with phased clock generators in at least one embodiment.

FIG. 7 is a block diagram of an on-die IC controller 2100 with a USB-PD subsystem with phased clock generators in at least one embodiment. IC controller 2100 is example semiconductor device that is configured in accordance with the reference and phased clock generators described herein. In the embodiment illustrated in FIG. 7, IC controller 2100 is a single-chip IC controller manufactured on a semiconductor die. In another example, IC controller 2100 may be a single-chip IC that is manufactured as a System-on-Chip (SoC). In other embodiments, the IC controller 2100 may be a multi-chip module encapsulated in a single semiconductor package. Among other components, IC controller 2100 includes central processing unit (CPU) subsystem 2102, system interconnect 2112, peripheral interconnect 2114, system resources 2116, input/output (I/O) subsystem 2118, USB-PD subsystem 2120, and various terminals (e.g., pins) that are configured for receiving and sending signals.

CPU subsystem 2102 includes one or more CPUs 2104, flash memory 2106, SRAM (Static Random Access Memory) 2108, and ROM (Read Only Memory) 2110 that are coupled to system interconnect 2112. CPU 2104 is a suitable processor that can operate in an IC or a SoC device. Flash memory 2106 is non-volatile memory (e.g., NAND flash, NOR flash, etc.) that is configured for storing data, programs, and/or other firmware instructions. Flash memory 2106 is tightly coupled within the CPU subsystem 2102 for improved access times. SRAM 2108 is volatile memory that is configured for storing data and firmware instructions accessed by CPU 2104. ROM 2110 is read-only memory (or other suitable storage medium) that is configured for storing boot-up routines, configuration parameters, and other firmware parameters and settings. System interconnect 2112 is a system bus (e.g., a single-level or multi-level Advanced High-Performance Bus, or AHB) that is configured as an interface that couples the various components of CPU subsystem 2102 to each other, as well as a data and control interface between the various components of the CPU subsystem and peripheral interconnect 2114.

Peripheral interconnect 2114 is a peripheral bus (e.g., a single-level or multi-level AHB) that provides the primary data and control interface between CPU subsystem 2102 and its peripherals and other resources, such as system resources 2116, I/O subsystem 2118, and USB-PD subsystem 2120. The peripheral interconnect 2114 may include various controller circuits (e.g., direct memory access, or DMA controllers), which may be programmed to transfer data between peripheral blocks without burdening the CPU subsystem 2102. In various embodiments, each of the components of the CPU subsystem and the peripheral interconnect may be different with each choice or type of CPU, system bus, and/or peripheral bus.

System resources 2116 include various electronic circuits that support the operation of IC controller 2100 in its various states and modes. For example, system resources 2116 may include a power subsystem having analog and/or digital circuits required for each controller state/mode such as, for example, sleep control circuits, wake-up interrupt controller (WIC), power-on-reset (POR), voltage and/or current reference (REF) circuits, etc. In some embodiments, the power subsystem may also include circuits that allow IC controller 2100 to draw and/or provide power from/to external sources with several different voltage and/or current levels and to support controller operation in several power states 2117 (e.g., such as active state, sleep state, and a deep sleep state with clocks turned off). Further, in some embodiments the CPU subsystem 2102 may be optimized for low-power operation with extensive clock gating and may include various internal controller circuits that allow the CPU to operate in the various power states 2117. For example, the CPU may include a wake-up interrupt controller that is configured to wake the CPU from a sleep state, thereby allowing power to be switched off when the IC chip is in the sleep state. System resources 2116 may also include a clock subsystem having analog and/or digital circuits for clock generation and clock management such as, for example, clock control circuits, watchdog timer (WDT) circuit(s), internal low-speed oscillator (ILO) circuit(s), and internal main oscillator (IMO) circuit(s), etc. System resources 2116 may also include analog and/or digital circuit blocks that provide reset control and support external reset (XRES).

In various embodiments, I/O subsystem 2118 may include various different types of I/O blocks and subsystems. For example, in the embodiment illustrated in FIG. 7, I/O subsystem 2118 includes GPIO (general purpose input output) blocks 2118a, TCPWM (timer/counter/pulse-width-modulation) blocks 2118b, and SCBs (serial communication blocks) 2118c. GPIOs 2118a include analog and/or digital circuits configured to implement various functions such as, for example, pull-ups, pull-downs, input threshold select, input and output buffer enabling/disabling, multiplex signals connected to various I/O pins, etc. TCPWMs 2118b include analog and/or digital circuits configured to implement timers, counters, pulse-width modulators, decoders and various other analog/mixed signal elements that are configured to operate on input/output signals. SCBs 2118c include analog and/or digital circuits configured to implement various serial communication interfaces such as, for example, I2C, SPI (serial peripheral interface), UART (universal asynchronous receiver/transmitter), CAN (Controller Area Network) interface, CXPI (Clock eXtension Peripheral Interface), etc.

USB-PD subsystem 2120 provides the interface to a USB Type-C® port and is configured to support USB communications as well other USB functionality, such as power delivery and battery charging. USB-PD subsystem 2120 includes the electro-static discharge (ESD) protection circuits required on a Type-C port. USB-PD subsystem 2120 also includes a Type-C transceiver and physical layer logic (PHY), which are configured as an integrated baseband PHY circuit to perform various digital encoding/decoding functions (e.g., Biphase Mark Code-BMC encoding/decoding, cyclical redundancy checks-CRC, etc.) and analog signal processing functions involved in physical layer transmissions. USB-PD subsystem 2120 also provides the termination resistors (RP and RD) and their switches, as required by the USB-PD specification, to implement connection detection, plug orientation detection, and power delivery roles over a Type-C cable. IC controller 2100 (and/or the USB-PD subsystem 2120 thereof) may also be configured to respond to communications defined in a USB-PD Specification such as, for example, SOP (start-of-packet), SOP', and SOP" messaging. USB-PD subsystem 2120 may further include a reference and/or phase clock controller 2101 to generate the reference clock signals and phase-shifted clock signals as described herein.

Among other circuitry, USB-PD subsystem 2120 may further include: one or more analog-to-digital convertors (ADCs) for converting various analog signals to digital signals; a VCONN FET; an error amplifier (ERROR AMP) for controlling the power source voltage applied to the VBUS line per a PD contract; a high voltage regulator (HV REG) for converting the power supply voltage to the precise voltage (e.g., 3-5V) needed to IC controller 2100; a current sense amplifier (CSA) and an over-voltage protection (OVP) circuits for providing over-current (OCP) and over-voltage (OV) protection and under-voltage (UV) protection on the VBUS line with configurable thresholds and response times; a pulse width modulator (PWM); one or more gate drivers (GATE DRV) for controlling the power switches that turn ON and off the provision of power over the VBUS line; a low-side gate driver (LSDR), a high-side gate driver (HSDR) for controlling switches of the buck-boost converter; a communication channel PHY (CC BB PHY) logic for supporting communications on a Type-C Communication Channel (CC) line; a charging protocol detection block (CHG DET) to detect different type of PD chargers; and at least two on-die discharge (VBUS DISCH) circuits that can discharge a VBUS line voltage to any of range of programmable voltage levels.

Various embodiments of the switching clock phase shift for multi-port power converters described herein may include various operations. These operations may be performed and/or controlled by hardware components, digital hardware and/or firmware, and/or combinations thereof. As used herein, the term "coupled to" may mean connected directly or connected indirectly through one or more intervening components. Any of the signals provided over various on-die buses may be time multiplexed with other signals and provided over one or more common on-die buses. Additionally, the interconnection between circuit components or blocks may be shown as buses or as single signal lines. Each of the buses may alternatively be one or more single signal lines and each of the single signal lines may alternatively be buses.

Certain embodiments may be implemented by firmware instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for switching clock phase shifts for multi-port buck-boost converters described herein. The non-transitory computer-readable storage medium may include, but is not limited to, electromagnetic storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A multi-port Universal Serial Bus Type-C Power Delivery (USB-C/PD) power converter comprising:
   a first USB-C/PD port;
   a second USB-C/PD port; and
   a power controller coupled to the first USB-C/PD port and the second USB-C/PD port, the power controller comprising:
      a first phased clock generator to generate a first phase-shifted clock signal by shifting a clock signal by a first phase with respect to a reference clock signal, wherein the reference clock signal comprises a first frequency and the clock signal comprises a second frequency that is greater than the first frequency; and
      a second phased clock generator to generate a second phase-shifted clock signal by shifting the clock signal by a second phase with respect to the reference clock signal, wherein:
         the first USB-C/PD port is to output power in response to a first control signal, the first control signal being based on the first phase-shifted clock signal; and
         the second USB-C/PD port is to output power in response to a second control signal, the second control signal being based on the second phase-shifted clock signal.

2. The multi-port USB-C/PD power converter of claim 1, further comprising:
   a reference clock generator to generate the reference clock signal; and
   a clock generator to generate the clock signal.

3. The multi-port USB-C/PD power converter of claim 1, further comprising:
   a first buck-boost converter coupled to the first USB-C/PD port and to an input voltage source; and
   a second buck-boost converter coupled to the second USB-C/PD port and to the input voltage source, wherein the power controller further comprises:
      a first buck-boost controller to receive the first phase-shifted clock signal and generate the first control signal; and
      a second buck-boost controller to receive the second phase-shifted clock signal and generate the second control signal.

4. The multi-port USB-C/PD power converter of claim 1, further comprising:
   a first high-side (HS) switch and a first low-side (LS) switch coupled to an input voltage source;
   a second HS switch and a second LS switch coupled to the first USB-C/PD port;
   a third HS switch and a third LS switch coupled to the input voltage source; and
   a fourth HS switch and a fourth LS switch coupled to the second USB-C/PD port.

5. The multi-port USB-C/PD power converter of claim 4, wherein the power controller further comprises:
   a first buck-boost controller to receive the first phase-shifted clock signal and generate the first control signal;
   a first buck-side gate driver to receive the first control signal and control the first HS switch and the first LS switch;
   a first boost-side gate driver to receive the first control signal and control the second HS switch and the second LS switch;
   a second buck-boost controller to receive the second phase-shifted clock signal and generate the second control signal;
   a second buck-side gate driver to receive the second control signal and control the third HS switch and the third LS switch; and
   a second boost-side gate driver to receive the second control signal and control the fourth HS switch and the fourth LS switch.

6. The multi-port USB-C/PD power converter of claim 1, further comprising:
   a third USB-C/PD port coupled to the power controller, wherein the power controller further comprises a third phased clock generator to generate a third phase-shifted clock signal by shifting the clock signal by a third phase with respect to the reference clock signal wherein:
      the third USB-C/PD port is to output power in response to a third control signal, the third control signal being based on the third phase-shifted clock signal.

7. The multi-port USB-C/PD power converter of claim 1, wherein the first phase is between 0 degrees and 180 degrees and the second phase is between 0 degrees and 180 degrees.

8. The multi-port USB-C/PD power converter of claim 1, wherein the first control signal and the second control signal are non-overlapping.

9. The multi-port USB-C/PD power converter of claim 1, wherein the multi-port USB-C/PD power converter is a buck-boost converter.

10. The multi-port USB-C/PD power converter of claim 1, wherein the multi-port USB-C/PD power converter is one of a buck converter, a boost converter, or an alternating current-to-direct current (AC-DC) converter.

11. A method for a Universal Serial Bus Type-C Power Delivery (USB-C/PD) controller, the method comprising:
   generating, by a first phased clock generator in the USB-C/PD controller, a first phase-shifted clock signal by shifting a clock signal by a first phase with respect to a reference clock signal, wherein the reference clock signal comprises a first frequency and the clock signal comprises a second frequency that is greater than the first frequency;
   generating, by a second phased clock generator in the USB-C/PD controller, a second phase-shifted clock signal by shifting the clock signal by a second phase with respect to the reference clock signal;
   outputting, by a first USB-C/PD port, power in response to a first control signal, the first control signal being based on the first phase-shifted clock signal; and
   outputting, by a second USB-C/PD port, power in response to a second control signal, the second control signal being based on the second phase-shifted clock signal.

12. The method of claim 11, further comprising:
   generating, by a reference clock generator, the reference clock signal; and
   generating, by a clock generator, the clock signal.

13. The method of claim 11, further comprising:
   receiving, by a first buck-boost controller, the first phase-shifted clock signal;
   generating, by the first buck-boost controller, the first control signal;
   receiving, by a second buck-boost controller, the second phase-shifted clock signal; and
   generating, by the second buck-boost controller, the second control signal.

14. The method of claim 13, further comprising:
   receiving, by a first buck-side gate driver, the first control signal and controlling a first high-side (HS) switch and a first low-side (LS) switch based on the first control signal;

receiving, by a first boost-side gate driver, the first control signal and controlling a second HS switch and a second LS switch based on the first control signal;

receiving, by a second buck-side gate driver, the second control signal and controlling a third HS switch and a third LS switch based on the second control signal; and receiving, by a second boost-side gate driver, the second control signal and controlling a fourth HS switch and a fourth LS switch based on the second control signal.

15. The method of claim 14, wherein:

the first HS switch and the first LS switch are coupled to an input voltage source;

the second HS switch and the second LS switch are coupled to the first USB-C/PD port;

the third HS switch and the third LS switch are coupled to the input voltage source; and the fourth HS switch and the fourth LS switch are coupled to the second USB-C/PD port.

16. The method of claim 11, further comprising:

generating, by a third phased clock generator in the USB-C/PD USB controller, a third phase-shifted clock signal by shifting the clock signal by a third phase with respect to the reference clock signal; and outputting, by a third USB-C/PD port, power in response to a third control signal, the third control signal being based on the third phase-shifted clock signal.

17. The method of claim 11, wherein the first phase is between 0 degrees and 180 degrees and the second phase is between 0 degrees and 180 degrees.

18. An integrated circuit (IC) Universal Serial Bus (USB) Type-C Power Delivery (USB-C/PD) controller comprising:

a first terminal to be coupled to a first USB-C/PD port;

a second terminal to be coupled to a second USB-C/PD port;

a reference clock generator to generate a reference clock signal with a first frequency;

a clock generator to generate a clock signal with a second frequency, wherein the second frequency is greater than the first frequency;

a first phased clock generator to generate a first phase-shifted clock signal by shifting the clock signal by a first phase with respect to the reference clock signal; and a second phased clock generator to generate a second phase-shifted clock signal by shifting the clock signal by a second phase with respect to the reference clock signal.

19. The IC USB-C/PD USB controller of claim 18, wherein:

the first USB-C/PD port is to output power in response to a first control signal, the first control signal being based on the first phase-shifted clock signal; and the second USB-C/PD port is to output power in response to a second control signal, the second control signal being based on the second phase-shifted clock signal.

20. The IC USB-C/PD USB controller of claim 18, further comprising:

a first buck-boost controller to receive the first phase-shifted clock signal and generate a first control signal;

a first buck-side gate driver to receive the first control signal and control a first high-side (HS) switch and a first low-side (LS) switch, the first HS switch and the first LS switch being coupled to an input voltage source;

a first boost-side gate driver to receive the first control signal and control a second HS switch and a second LS switch, the second HS switch and the second LS switch being coupled to the first USB-C/PD port;

a second buck-boost controller to receive the second phase-shifted clock signal and generate a second control signal;

a second buck-side gate driver to receive the second control signal and control a third HS switch and a third LS switch, the third HS switch and the third LS switch being coupled to the input voltage source; and a second boost-side gate driver to receive the second control signal and control a fourth HS switch and a fourth LS switch, the fourth HS switch and the fourth LS switch being coupled to the second USB-C/PD port.

* * * * *